(12) United States Patent
Mattson

(10) Patent No.: US 11,119,808 B2
(45) Date of Patent: Sep. 14, 2021

(54) GEO-DISTRIBUTED COMPUTATION AND ANALYTICS BASED ON COST OF TRANSPORTING AND COMPUTATIONAL COST

(71) Applicant: Mistnet.io, Inc., Mountain View, CA (US)

(72) Inventor: Geoffrey A. Mattson, Mountain View, CA (US)

(73) Assignee: Mistnet.io, Inc., Mountain View, CA (US)

( * ) Notice: Subject to any disclaimer, the term of this patent is extended or adjusted under 35 U.S.C. 154(b) by 335 days.

(21) Appl. No.: 16/245,085

(22) Filed: Jan. 10, 2019

(65) Prior Publication Data

US 2019/0213036 A1  Jul. 11, 2019

Related U.S. Application Data

(60) Provisional application No. 62/615,849, filed on Jan. 10, 2018.

(51) Int. Cl.
| | |
|---|---|
| *G06F 9/46* | (2006.01) |
| *H04L 12/46* | (2006.01) |
| *H04L 29/08* | (2006.01) |
| *G06F 15/173* | (2006.01) |
| *G06F 9/50* | (2006.01) |
| *H04L 29/06* | (2006.01) |

(52) U.S. Cl.
CPC ............ *G06F 9/466* (2013.01); *G06F 9/5072* (2013.01); *G06F 9/5077* (2013.01); *G06F 15/173* (2013.01); *H04L 12/4633* (2013.01); *H04L 67/10* (2013.01); *G06F 2209/502* (2013.01); *H04L 63/0272* (2013.01); *H04L 63/1408* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 9,667,657 | B2 * | 5/2017 | Efremov | H04L 67/10 |
| 9,716,666 | B2 * | 7/2017 | Broussard | G06F 9/5083 |
| 10,757,177 | B1 * | 8/2020 | Wang | H04L 67/12 |
| 2013/0346614 | A1 * | 12/2013 | Baughman | G06F 9/5083 |
| | | | | 709/226 |

\* cited by examiner

*Primary Examiner* — Bing Zhao
(74) *Attorney, Agent, or Firm* — Shumaker & Sieffert, P.A.

(57) ABSTRACT

A Multi-site Integrated Session-oriented Transaction (MIST) computing system includes a MIST mapper configured to process a compiled distributed compute session request to determine, for each of at least one remote sets of data, whether to process the remote set of data with one of one or more field nodes or with a cloud node based on a cost of transporting the remote set of data from the proximate field node to the cloud node. In response to determining to process the remote set of data with the cloud node, the MIST mapper is configured to output a data retrieval request to the proximate field node. In response to determining to process the remote set of data with the field node, the MIST mapper is configured to output the computation request to the proximate field node.

20 Claims, 8 Drawing Sheets

GEO-DISTRIBUTED COMPUTATION AND ANALYTICS BASED ON COST OF TRANSPORTING AND COMPUTATIONAL COST

PRIORITY CLAIM

This application claims the benefit of U.S. Provisional Application No. 62/615,849, filed Jan. 10, 2018, the entire content of which is incorporated herein by reference.

TECHNICAL FIELD

This disclosure relates to data analytics and, more specifically, to processing data that is geographically dispersed.

BACKGROUND

In a typical cloud data center environment, there is a large collection of interconnected servers that provide computing and/or storage capacity to run various applications. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers.

Modern analytics architectures take advantage of distributed processing. For example, a single logical data set can be distributed in the memory of multiple processors. As such, modern analytics architectures enable data that is larger than that which can fit into a single computer to be operated on in a single session. An additional benefit is computational parallelization which is becoming increasingly important as periodic improvement in single core performance recedes.

SUMMARY

In general, techniques are described for mapping a distributed compute session to execute over a geographically-distributed set of multiple compute nodes having associated, geographically-distributed data for a distributed dataset. For example, a Multi-site Integrated Session-oriented Transaction (MIST) computing system is described for interconnecting multiple distributed remote compute nodes ("field nodes") and local compute nodes ("cloud nodes") to enable a data pipeline from data that is geographically proximate to the field nodes to the local compute nodes, and to determine placement of functions to be executed by the compute nodes for processing the data. A distributed compute session includes the application of multiple operations (or "functions") to data of a distributed dataset, with pipelining of the operations based on data and function dependences. The distributed compute session may be represented by a computational graph, with nodes of the graph represented functions applied by compute nodes, and edges representing data dependencies between functions. The MIST system described herein applies optimization techniques to reduce and, in some cases, optimize a cost function that calculates the optimal locations of functions within the MIST system based on a set of metrics. The cost function metrics may include, e.g., the computational graph for the distributed compute session, data transfer cost associated with network latencies for instance, policy/security requirements, and the value of the data for various operations at each location.

The techniques described in this disclosure provide at least one practical application of a technical improvement to the field of distributed computing. For instance, optimizing a cost function that calculates the optimal location of functions within the MIST system may reduce the overall latency within the system for processing a distributed dataset, where the overall latency accounts for full processing of the computational graph, for instance.

In one example, a MIST computing system includes: one or more field nodes; a central processing facility comprising one or more cloud nodes, the central processing facility geographically remote from each of the one or more field nodes; a wide area network comprising one or more virtual links, each virtual link of the one or more virtual links connecting a corresponding field node of the one or more field nodes to at least one of the cloud nodes; a MIST controller comprising a MIST compiler and a MIST mapper, executing on a computing platform, wherein the MIST compiler is configured to process a distributed compute session request for a distributed dataset to generate a compiled distribute compute session request comprising one or more functions and one or more data dependencies, wherein the distributed dataset comprises one or more geographically-distributed sets of data, the sets of data including at least one remote set of data that is proximate to one of the field nodes, and wherein the MIST mapper is configured to: process the compiled distributed compute session request to determine, for each of the at least one remote sets of data, whether to process the remote set of data with one of the field nodes that is proximate to the remote set of data or with a cloud node of one of the cloud nodes, based on a cost of transporting the remote set of data from the proximate field node to the cloud node via one of the plurality of virtual links; in response to determining to process the remote set of data with the cloud node, output a data retrieval request to the proximate field node to cause the proximate field node to send the remote set of data to the cloud node for processing at the cloud node; and in response to determining to process the remote set of data with the field node, output a computation request to the proximate field node to cause the proximate field node to process the remote set of data.

In another example, a method for MIST computing includes: processing, by processing circuitry, a distributed compute session request for a distributed dataset to generate a compiled distribute compute session request comprising one or more functions and one or more data dependencies, wherein the distributed dataset comprises one or more geographically-distributed sets of data, the sets of data including at least one remote set of data that is proximate to one of one or more field nodes, wherein a wide area network comprises one or more virtual links, each virtual link of the one or more virtual links connecting a corresponding field node of the one or more field nodes to at least a cloud node of one of one or more cloud nodes of a central processing facility, the central processing facility being geographically remote from each of the one or more field nodes; processing, by the processing circuitry, the compiled distributed compute session request to determine, for each of the at least one remote sets of data, whether to process the remote set of data with one of the field nodes that is proximate to the remote set of data or with a cloud node of one of the cloud nodes, based on a cost of transporting the remote set of data from the proximate field node to the cloud node via one of the plurality of virtual links, in response to determining to process the remote set of data with the cloud node, outputting, by the processing circuitry, a data retrieval request to the proximate field node to cause the proximate field node to send the remote set of data to the cloud node for processing at the cloud node; and in response to determining to process the remote set of data with the field node, outputting, by the processing circuitry, a computation request to the proximate field node to cause the proximate field node to process the remote set of data.

In another example, a computer-readable storage device comprises instructions that, when executed, cause one or more processors to perform operations including: processing a distributed compute session request for a distributed dataset to generate a compiled distribute compute session request comprising one or more functions and one or more data dependencies, wherein the distributed dataset comprises one or more geographically-distributed sets of data, the sets of data including at least one remote set of data that is proximate to one of one or more field nodes, wherein a wide area network comprises one or more virtual links, each virtual link of the one or more virtual links connecting a corresponding field node of the one or more field nodes to at least a cloud node of one of one or more cloud nodes of a central processing facility, the central processing facility being geographically remote from each of the one or more field nodes; processing the compiled distributed compute session request to determine, for each of the at least one remote sets of data, whether to process the remote set of data with one of the field nodes that is proximate to the remote set of data or with a cloud node of one of the cloud nodes, based on a cost of transporting the remote set of data from the proximate field node to the cloud node via one of the plurality of virtual links, in response to determining to process the remote set of data with the cloud node, outputting a data retrieval request to the proximate field node to cause the proximate field node to send the remote set of data to the cloud node for processing at the cloud node; and in response to determining to process the remote set of data with the field node, outputting a computation request to the proximate field node to cause the proximate field node to process the remote set of data.

The details of one or more examples of the invention are set forth in the accompanying drawings and the description below. Other features, objects, and advantages of the invention will be apparent from the description and drawings, and from the claims.

BRIEF DESCRIPTION OF DRAWINGS

Like reference characters refer to like elements throughout the figures and description.

DETAILED DESCRIPTION

Software frameworks have emerged, notably Apache Hadoop™, and then Apache Spark™, and Apache Flink™, that capitalize on using a single logical data set distributed in memory of multiple processors. Such frameworks may work well when data is resident in a single data center with low latency connections between the compute nodes. However, such frameworks break down in whole or in part when nodes are separated by a wide geographic distance. As a result, some systems for "big data" applications that operate on geographically-dispersed data may include two stages: a collection/telemetry pipeline and analytics cluster.

Figure 1:
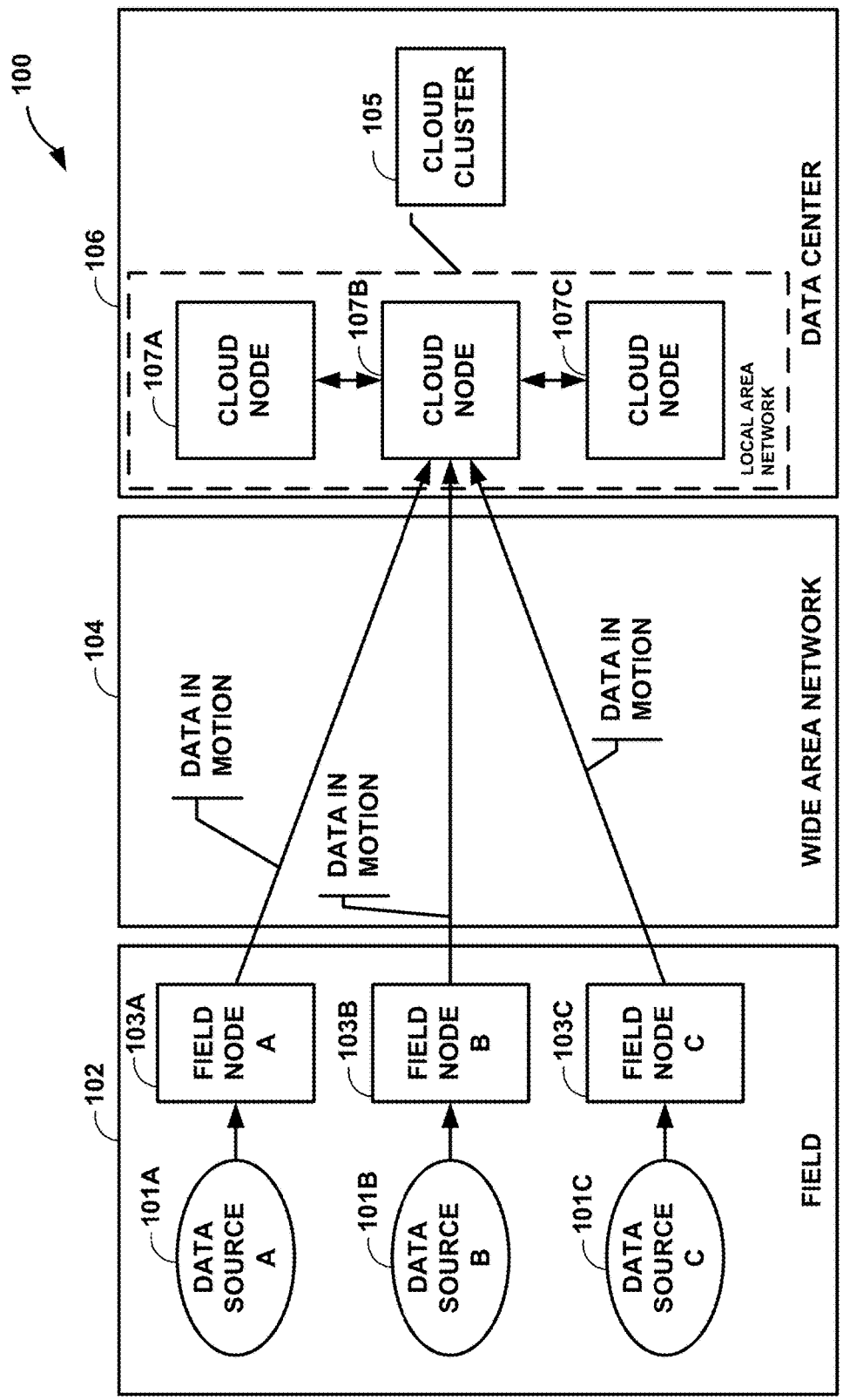
FIG. 1 shows a block diagram illustrating an analytics pipeline with field data telemetry and central cloud analytics, according to techniques of this disclosure.

FIG. 1 shows a block diagram illustrating an analytics pipeline with field data telemetry and central cloud analytics, according to techniques of this disclosure. System 100 includes field 102, Wide Area Network 104 (WAN 104), and data center 106. As shown, field 102 may include data source 101A, data source 101B, and data source 101C (collectively, data sources 101) and field node 103A, field node 103B, field node 103C (collectively, field nodes 103). Data center 106 may include cloud node 107A, cloud node 107B, cloud node 107C (collectively, cloud nodes 107) and cloud cluster 105. While the example of FIG. 1 illustrates three data sources, field 102 may include, for example, one data source, two data sources, or more than three data sources. Similarly, field 102 may include, for example, one field node, two field nodes, or more than three field nodes. While the example of FIG. 1 illustrates three cloud nodes, data center 106 may include, for example, one cloud node, two cloud nodes, or more than three cloud nodes. Data center 106 is referred to as a central processing facility for applications involving distributed computing, and includes the one or more cloud nodes 107.

The field 102 represents geographic locations external to the data center 106. For example, field nodes 103 located in the field 102 may be physically located in other data centers (i.e., not data center 106); branch offices; or other remote locations. Data sources 101 generating data sent, in the example of FIG. 1, to cloud node 107B, may represent end user devices such as workstations, smartphones, tablets, etc.; real and/or virtual servers; intrusion detection and prevention (IDP) systems such as Universal Threat Management (UTM), firewalls, next-generation firewalls, and the like; laboratory or measurement equipment; or other data source. Data sources 101 and their corresponding field nodes 103 may be the same device. For example, a firewall instance of field node 103C may both generate data (i.e., be data source 101C) and process the data, in accordance with techniques described herein, in some examples. Field 102 may represent multiple different geographic locations, and the different locations and data center 102 are different sites.

As shown in FIG. 1, a collection/telemetry pipeline of system 100 may transfer all of the data generated by data sources 101 of field 102 into a single data center 106 where an analytics cluster (e.g., cloud cluster 105) may operate on all of the data. The cloud nodes 107A-107C of analytics cluster may be interconnected by a low-latency Local Area Network (LAN) network and may transfer the data between cloud nodes 107 with low latency and at low cost. Each of cloud nodes 107 may represent a real and/or virtual server and may execute one or more functions to process any of the data in motion in accordance with distributed processing techniques.

Using a single logical data set distributed in memory of multiple processors may be problematic. For example, in such systems, transmitting data from field nodes 103 to data center 106 may be expensive if the data is large and the WAN costs of WAN 104 are high, where WAN costs may include latency costs, financial costs, costs to privacy, operational complexity, and so forth. Additionally, when using a single logical data set distributed in memory of multiple processors, entire nodes (e.g., field nodes, cloud nodes, etc.) may be dedicated to marshalling, formatting, sending, and receiving the data.

In some examples, using a single logical data set distributed in memory of multiple processors may result in a delay in processing data during the entire preparation, transport, and ingest phases.

In some examples, systems using a single logical data set distributed in memory of multiple processors may not satisfy security and/or privacy policies and laws that restrict the movement of data out of an enterprise site or out of a geo-location. National legal code such as that of the Democratic Republic of Germany, Pan-national regulations such those of the European Union and industry specific laws such as Health insurance Portability and Accountability Act of 1996 (HiPPA) and Payment Card Industry (PCI) data security standard in the United States are examples of regimes restricting the movement of such data.

In some examples, systems using a single logical data set distributed in memory of multiple processors may perform a transporting of data that adds complexity and cost. For instance, the network bandwidth itself may be expensive. In some instances, such systems may include dedicated processors on each end of the connection to buffer, serialize, and de-serialize the date. In some instances, a streaming pipeline may be managed and may become time-consuming and operationally expensive.

In some examples, systems using a single logical data set distributed in memory of multiple processors may include an analytics cluster that is separate and configured to merge incoming data with current data. As such, architectural approaches including, for example, a lambda architecture may be applied. However, such architectural approaches may use additional resources and add complexity over a batch cluster.

In some examples, systems using a single logical data set distributed in memory of multiple processors may add to a sheer volume of data that can be overwhelming and may discourage certain use cases.

In some examples, a value of field data can be highly dynamic. As such, any piece of data may be vital on an occasional basis but completely ignored in most daily operations. As such, data may be constantly shipped to the central data center even if it is almost never used.

In accordance with techniques described herein, system 100 (e.g., a MIST computing system) maps a distributed compute session to execute at least partially over a geographically-distributed set of multiple compute nodes having associated, geographically-distributed data for a distributed dataset. For example, a Multi-site Integrated Session-oriented Transaction (MIST) computing system is described for interconnecting multiple distributed remote compute nodes (field nodes 103) and local compute nodes (cloud nodes 107) to enable a data pipeline from data that is geographically proximate to the field nodes to the local compute nodes, and to determine placement of functions to be executed by the compute nodes for processing the data.

For example, a system may be configured to assign work to each node accordingly. Furthermore, as used herein, the term "optimal" may be defined by the needs of the user. A user may want to optimize for a number of things, for example, a quickest result, a least expensive resource usage, or another parameter. This disclosure describes an example Multi-site Integrated Session-oriented Transaction (MIST) computing system.

As used herein, "cloud" may be used to describe data centers that are remote to the clients they serve. The cloud may have several enormous advantages in achieving analytic results. For example, a cloud may include on-demand and/or elastic resources. In some examples, a cloud may include heterogeneous resources such, but not limited to, Graphical Processor Units (GPUs) and other specialized computing units for deep-learning, server-less processes, etc. In some examples, a cloud may include an ability to merge with cloud-native applications.

System 100 (e.g., a Multi-site Integrated Session-oriented Transaction (MIST) computing system) may be configured to extend cloud computing such that some of the data and processing may be done outside data center 106 and close to data sources 101 or even on the network itself. For instance, system 100 may be configured such that a single compute session may be run on field nodes 103, cloud nodes 107, or both. In this way, data-centric distributed computing may be optimized over a geographically dispersed area compared to systems, such as the aforementioned Apache software frameworks, that require the logical data set to be collected and processed by a cluster having low-latency interconnections. Such distributed processing, in which the computing system 100 optimizes a cost function to calculate optimal locations of processing functions, is referred to herein as "MIST computing."

MIST computing may be accomplished by placing remote compute nodes out of data center 106 and into field 102 where the remote compute node is close to the data. Then these remote compute nodes (e.g., one or more of field nodes 103) are linked with one or more of cloud nodes 107 and may be managed under the same administration, may run the same middleware, and participate in the same session. A result is issued as a single transaction to the user even though multiple geographically dispersed sites may be involved.

Rather than streaming data into a cloud and then processing the data, system 100 may process at least some of the data geographically proximate to where the data is produced. The software, frameworks, processes and practices of running over a large-scale cloud may also extended to the field. MIST computing may help to optimize data movement while enabling full use of state-of-the-art software tools that assume the data is all locally resident. A MIST network may encompass the compute/storage nodes as well as the local and wide area network.

Figure 2:
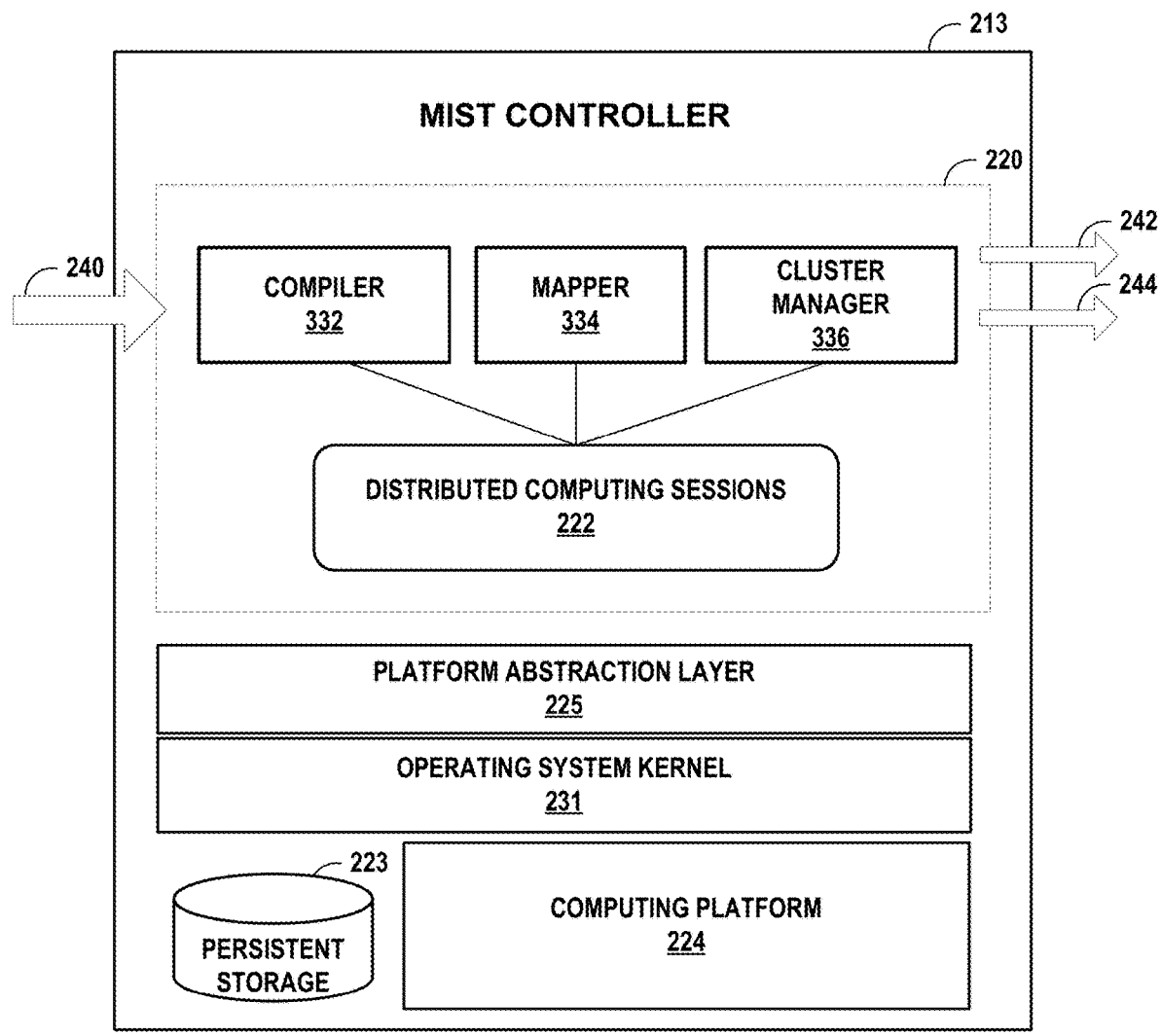
FIG. 2 is a block diagram illustrating an example of a node in accordance with techniques described in this disclosure.

FIG. 2 is a block diagram illustrating an example of a MIST controller 213 for a MIST system, according to techniques of this disclosure. MIST controller 213 includes MIST components for identifying and determining placement of functions to be executed by geographically-distributed compute nodes for processing a geographically-distributed dataset.

In the illustrated example, MIST controller 213 includes MIST components 220 for controlling a MIST computing system. MIST controller 213 may be implemented on a computing platform, such as a high-end server, having a computing platform 224. Computing platform 224 may include any number of processors and any number of hardware cores from, for example, four to thousands. Computing platform 224 includes memory for storing instructions for the processors and data.

In the example of FIG. 2, MIST controller 213 includes a platform abstraction layer 225 that presents certain functionality of underlying operating system kernel 231 to MIST components 220, such as memory management and hardware I/O. In one example, one or more virtual machines or containers may execute within an overall process space provided by operating system kernel 231. Operating system kernel 231 may be, for example, a Linux, Berkeley Software Distribution (BSD), another Unix-variant kernel, or a Windows operating system kernel, available from Microsoft Corp.

MIST components 220 receive distributed compute session requests 240, process the requests 240, and output data retrieval requests 242 and computation requests 244 to compute nodes to optimize the corresponding distributed compute sessions 222 for the requests 240. In general, compiler 332 compiles a distributed compute session request 240 into set of functions for processing a distributed data set. A distributed compute session request 240 may specify a distributed dataset and a set of functions. Compiler 332 may generate a dataflow graph or other computational graph that represents the distributed computation functions and data in terms of dependencies between the individual functions to be applied to the data. The computational graph may represent different functions as nodes and data dependencies as edges between the nodes, the edges also representing data or processed data that flow from one node to the other in the direction opposite the dependency. By identifying distinct functions within the distributed compute session requests 240, compiler 332 may in this way enable distributed execution of the distributed compute sessions 222 across multiple compute nodes.

In accordance with techniques of this disclosure, mapper 334 processes each compiled, distributed computing session 222 to map the different functions identified by compiler 332 to different compute nodes of a geographically-distributed set of multiple compute nodes having associated, geographically-distributed data for the distributed dataset to be processed according to the distributed computing session. Mapper 334 may apply optimization techniques to reduce and, in some cases, optimize a cost function that calculates, based on a set of metrics, the optimal locations of functions within a MIST system of the multiple compute nodes interconnected by one or more network links, with at least one of the multiple compute nodes being a field node connected to the rest of the cluster by WAN links. The cost function metrics may include, e.g., the computational graph for the distributed compute session, data transfer cost associated with network latencies for instance, policy/security requirements, and the value of the data for various operations at each location.

For a distributed computing session 222, mapper 334 generates and sends one or more data retrieval request 242 and one or more computation requests 244 to the field nodes of the MIST computing system controlled by MIST controller 213. As described below with respect to FIG. 4, mapper 334 determines whether a function of the distributed computing session is applied locally on a cloud node 107 (thus prompting a data retrieval request 242 requesting the field node 103 send the data to the cloud node 107 via one of the WAN links) or the function is applied remotely on the field node 103 (thus prompting a computation request 244 to the field node requesting the field node 103 process the data from associated data source 101 and, in some instances, send the results to one of cloud nodes 107).

Cluster manager 336 may represent an orchestration system and/or network controller for orchestration functions onto compute nodes of the MIST system and interconnecting nodes of the MIST system via network links. Cluster manager 336 may represent a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily hosting devices of a cluster. For example, the Kubernetes platform uses the terms "cluster master" and "minion nodes," while the Docker Swarm platform refers to cluster managers and cluster nodes. The cluster of cloud nodes 107, field nodes 103 may be, e.g., a Kubernetes cluster and the cluster manager a Kubernetes master node, in which case the field nodes 103, cloud nodes 107 are Kubernetes minion nodes.

Cluster manager 336 may be configured to track cluster resources, data proximity, and resource costs. Cluster manager 336 may configure virtual links connecting the field nodes to the cloud nodes. Virtual links may represent links of a virtual private LAN service, label-switched paths, tunnels for an Ethernet Virtual Private Network or other VPN (L2VPN, L3VPN, or similar), virtual circuits, pseudowires, or other links for connecting remote nodes across a WAN.

Figure 3A:
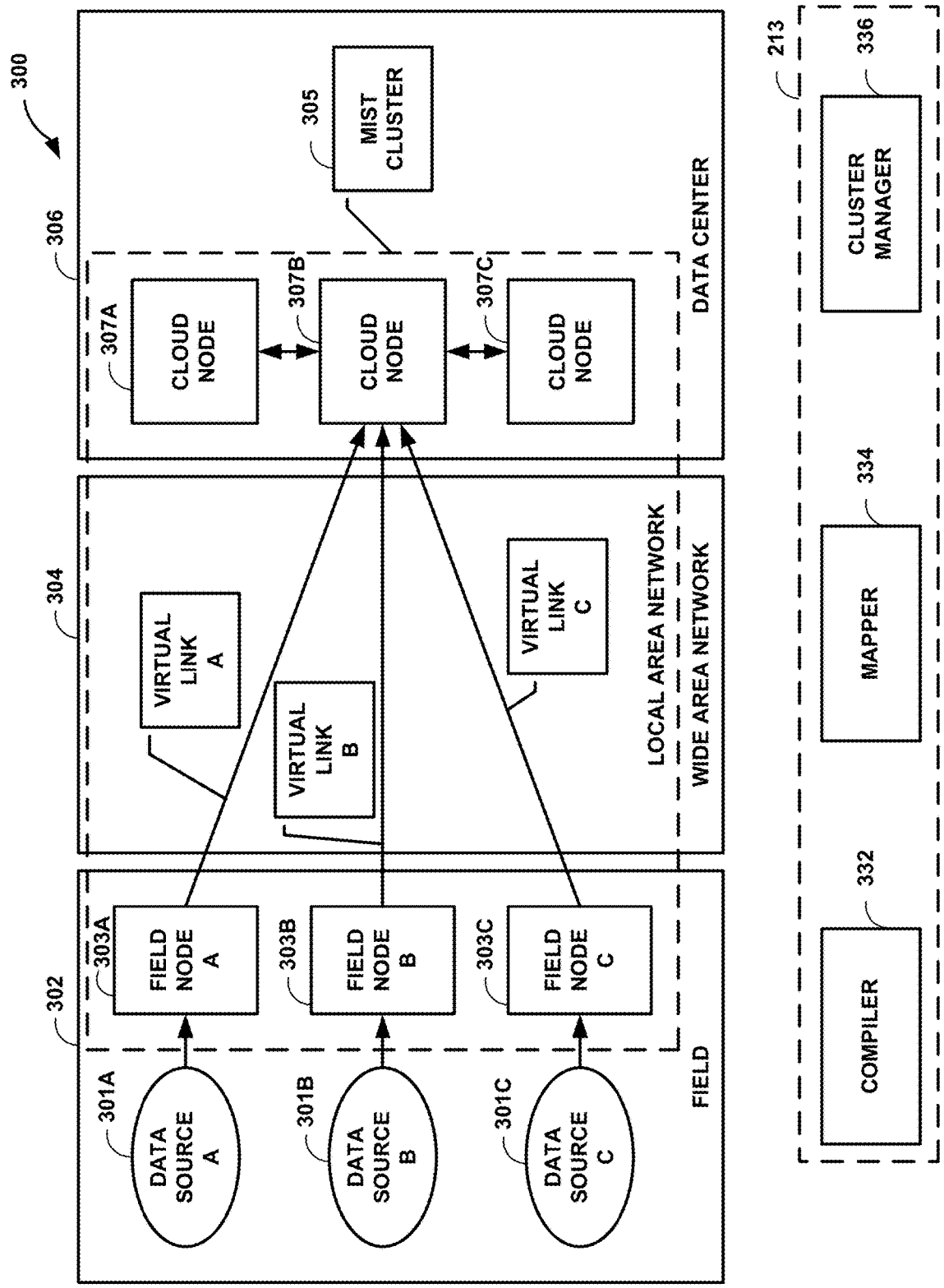
FIG. 3A is a block diagram illustrating an example Multi-site Integrated Session-oriented Transaction (MIST) computing system analytics cluster, in accordance with techniques described herein.

FIG. 3A is a block diagram illustrating an example MIST analytics cluster 305 (also referred to herein as simply "MIST cluster 305"), according to techniques of this disclosure. Cluster 305 may be an example of cloud cluster 105. As shown, system 300 (also referred to herein as "MIST network") may include field 302, WAN 304, and data center 306, which may be examples of field 102, WAN 104, and data center 106, respectively. For example, field 302 may include data source 301A, data source 301B, and data source 301C (collectively, data sources 301) and field node 303A, field node 303B, field node 303C (collectively, field nodes 303). Data center 306 may include cloud node 307A, cloud node 307B, cloud node 307C (collectively, cloud nodes 307) and MIST cluster 305. While the example of FIG. 3 illustrates three data sources, field 302 may include, for example, one data source, two data sources, or more than three data sources. Similarly, field 302 may include, for example, one field node, two field nodes, or more than three field nodes. While the example of FIG. 3 illustrates three cloud nodes, data center 306 may include, for example, one cloud node, two cloud nodes, or more than three cloud nodes. Field nodes 303 may collect data and provide fully functional analytics.

MIST Cluster 305 may be configured to allow secure, seamless communication between the all the compute and storage nodes (e.g., field nodes 303, cloud nodes 307, etc.). This communication to and from field nodes 303 may be resilient to changes in WAN 304. MIST cluster 305 may be configured to auto-initialize and re-initialize. Because MIST cluster 305 may be conducted over a public network, MIST cluster 305 may be secure. For example, MIST cluster 305 may apply auto-initializing, resilient, secure virtual connections between field nodes 303 and cloud nodes 307. In some examples, MIST cluster 305 may apply auto-initializing, resilient, secure virtual connections between field nodes 303 and other nodes of system 300. MIST cluster 305 may represent any of the clusters described herein and may include only cloud nodes 307 or both cloud nodes 307 and field nodes 303.

MIST compiler 332 may be configured accept a computation request from a client and feed the computation request to MIST system 300 for computation.

MIST session resource mapper 334 (also referred to herein as "MIST mapper 334" or simply "mapper 334") may be configured to, for every problem-solving session, assign a set of logical functions to the available compute nodes (e.g., field nodes 303, cloud nodes 307, etc.). In some examples, MIST mapper 334 may be configured for data location awareness, which may optimize this mapping over a MIST computing grid using a location of data sources relative to compute nodes.

In some examples, MIST mapper 334 may be configured to calculate a cost function to determine an optimal location of functions with the MIST network based on a set of metrics. The weights of these metrics may be administratively determined. The metrics may include, for example, but are not limited to: (a) a computational graph for the session, (b) data at each location, (c) a cost associated with transporting data over each edge of the graph, or other considerations such as common use of this cost function will be to optimize costs based on minimizing data movement.

Cluster manager 336 may be configured to track cluster resources, data proximity, and resource costs.

Figure 3B:
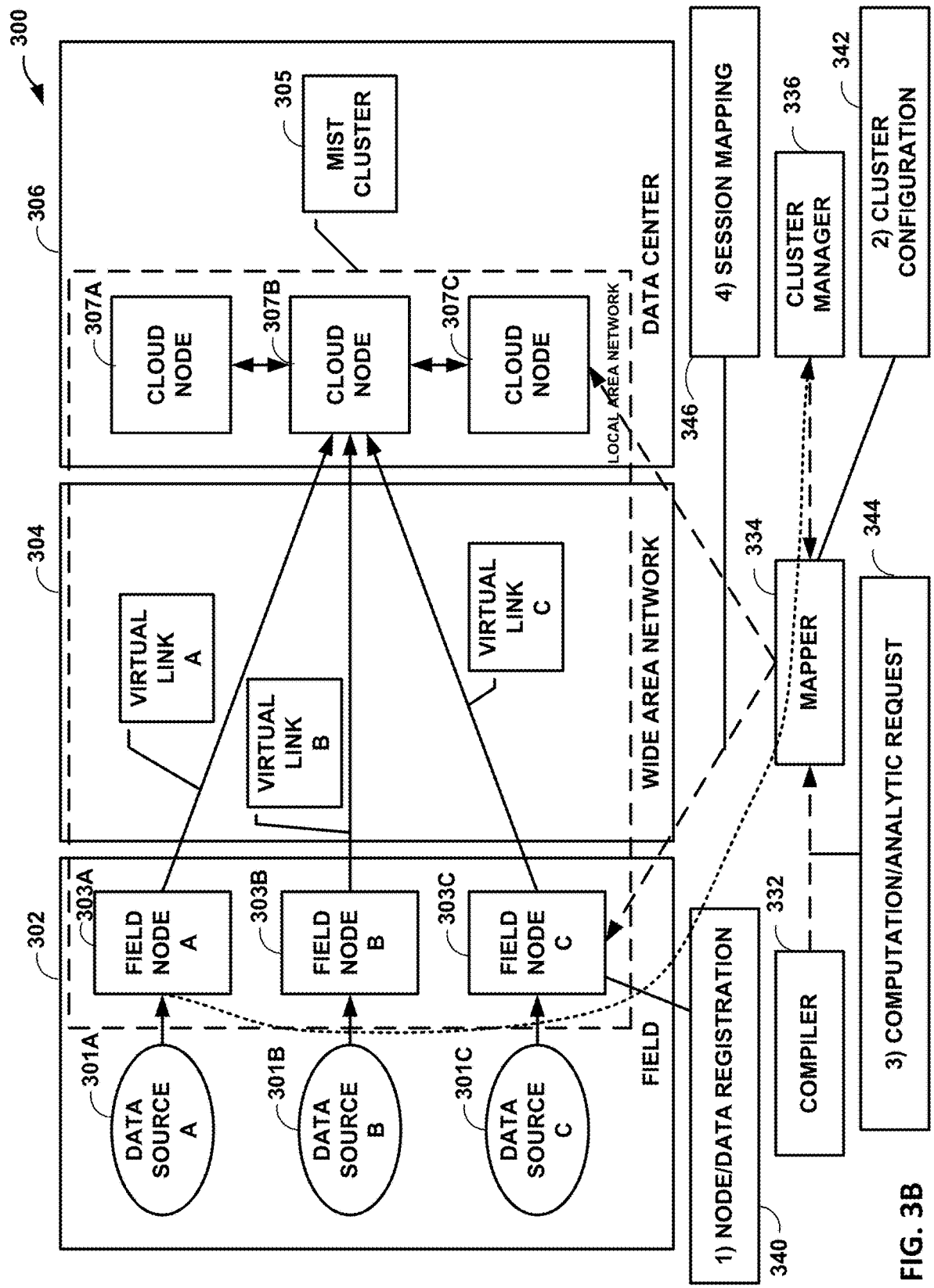
FIG. 3B shows a block diagram illustrating an operational sequence for a MIST network, in accordance with techniques described herein.

FIG. 3B shows a block diagram illustrating an operational sequence for a MIST network. MIST cluster 305 performs node registration (340). MIST cluster 305 may perform cluster configuration (342). MIST compiler 332 may perform a computation/analytic request (344). MIST mapper 334 may perform session mapping (346).

Figure 4:
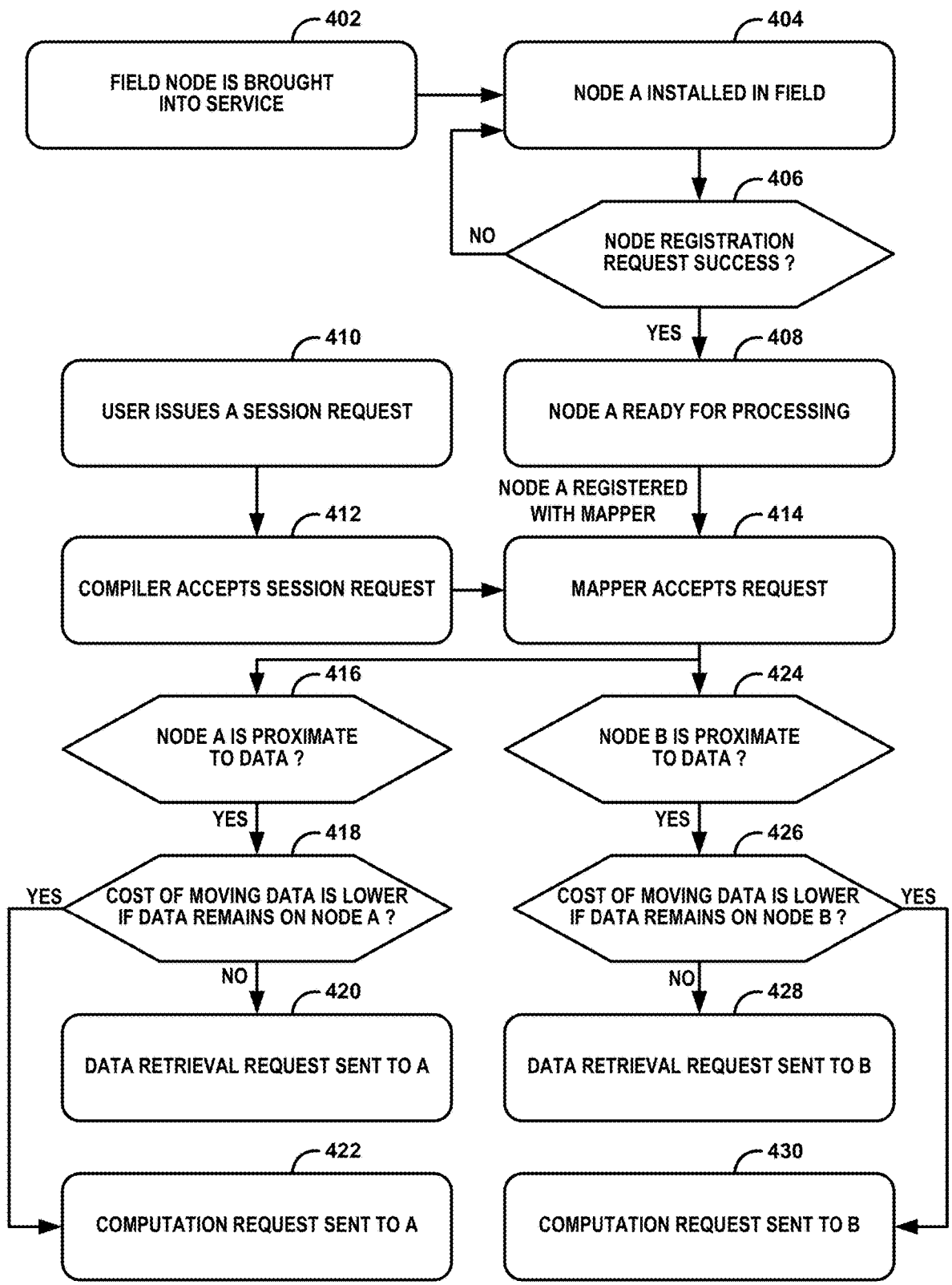
FIG. 4 shows a flow chart for analytics in a MIST cluster, in accordance with techniques described herein.

FIG. 4 shows a flow chart for analytics in MIST cluster 305. MIST cluster 305 brings a field node into service (402). MIST cluster 305 installs Node A (e.g., field node 303A) (404). Node A attempts to register with a MIST cluster master, establishes a secure tunnel, and provides the master (406). In response, to determining node registration is not successful ("No" of step 406), MIST cluster 305 performs step 404. In response, however, to determining node registration is successful ("Yes" of step 406), MIST cluster 305 determines Node A is ready for processing (408). MIST cluster 305 registers with MIST mapper 334 by outputting, to MIST mapper 334, an indication of which data MIST cluster 305 can access.

A user issues a session request to MIST compiler 332 (410). MIST compiler 332 accepts the session request (412). Node A has registered with MIST mapper 334 and MIST mapper 334 accepts the request from MIST compiler 332 (414).

MIST mapper 334 determines whether Node A is a proximate node to process the data (416). In response to determining Node A is a proximate node ("Yes" of step 416), MIST mapper 334 determines whether the cost is lower of processing the data on Node A rather than moving the data (416). In response to MIST mapper 334 determining the cost is not lower to process data on Node A rather than moving the data ("No" of step 416), MIST mapper 334 sends the data retrieval request to Node A (420). In response, however, to MIST mapper 334 determining the cost is lower to process data on Node A rather than moving the data ("Yes" of step 418), MIST mapper 334 sends a computation request to Node A (422). Although the example of FIG. 4 controls operation of Node A, MIST mapper 334 may control other nodes, such as Node B (e.g., field node 303B). A computation request may be a distributed compute session request 240.

MIST mapper 334 determines whether Node B is a proximate node to process the data (424). In response to determining Node B is a proximate node ("Yes" of step 424), MIST mapper 334 determines whether the cost is lower of processing the data on Node A rather than moving the data (426). For example, MIST mapper 334 may calculate the following:

$$((CF_d+D_1*T)<(CF_c+D_0*T)) \qquad \text{EQUATION 1}$$

where F( ) is a computation, D0 is input Data, D1 is output Data or F(D0)=D1, DS0 is a number of octets in D0, DS1 is a number of octets in D1, T is per bit transport cost per octet, Cd is computation cost per cpu cycle on distributed node, Cc is computation cost per cpu cycle on central node, P=number of cpu cycles to resolve F(D0), CFd=P*Cd, and CFc=P*Cc. In this example, if Equation 1 is true (e.g., If (($CF_d+D_1*T$)<($CF_c+D_0*T$))) then MIST mapper 334 determines the cost is lower to process data on Node B rather than moving the data. Cost may include, but is not limited to, transport cost, latency, represent data movement policies, or other costs.

In response to MIST mapper 334 determining the cost is not lower to process data on Node B rather than moving the data ("No" of step 426), MIST mapper 334 sends the data retrieval request to Node B (428). In response, however, to MIST mapper 334 determining the cost is lower to process data on Node B rather than moving the data ("Yes" of step 426), MIST mapper 334 sends a computation request to Node B (430).

Figure 5:
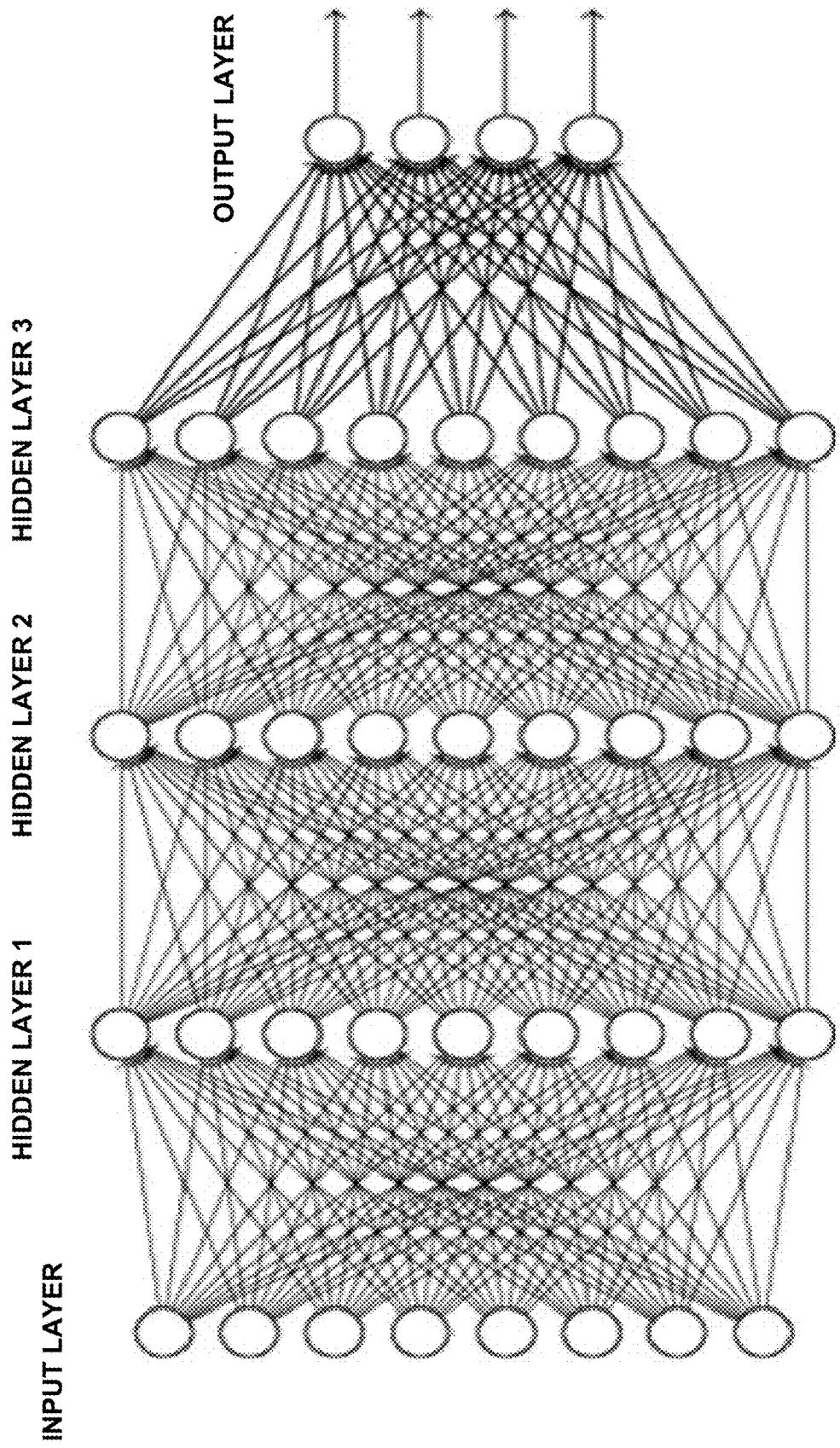
FIG. 5 shows a conceptual diagram of a basic deep neural network.

Deep-learning and graph computation on a MIST network is discussed in the following. An example application of MIST computing is deep learning. Deep learning may refer to a form of neural network-based machine learning which is inspired by neurobiological cognition. Deep learning may map data to input nodes of a graph which passes them to a series of hidden layers and produces modified data at the output later. The nodes may apply weights and biases to the data before passing it to the next node. Although the process may include neural architectures, other branches of machine learning such as decision trees may also be arranged in a pipeline that follows the principle of deep-learning as shown in FIG. 5.

Generative Mapping is discussed in the following. Given an input graph the mapper may generate a new graph that is functionally equivalent but structured in a way that is suited for a MIST network deployment. On a MIST computing platform, MIST mapper 334 may optimally map the computational graph.

Input nodes are mapped to data sources are discussed in the following. In feedforward networks, MIST mapper 334 may select convergence points to move the graph from one layer of the MIST hierarchy to the next layer. In this way, the data movement from one layer of the hierarchy to the next is minimized. In recurrent networks, techniques may also be used but the transition may avoid cycles within the network.

Figure 6:
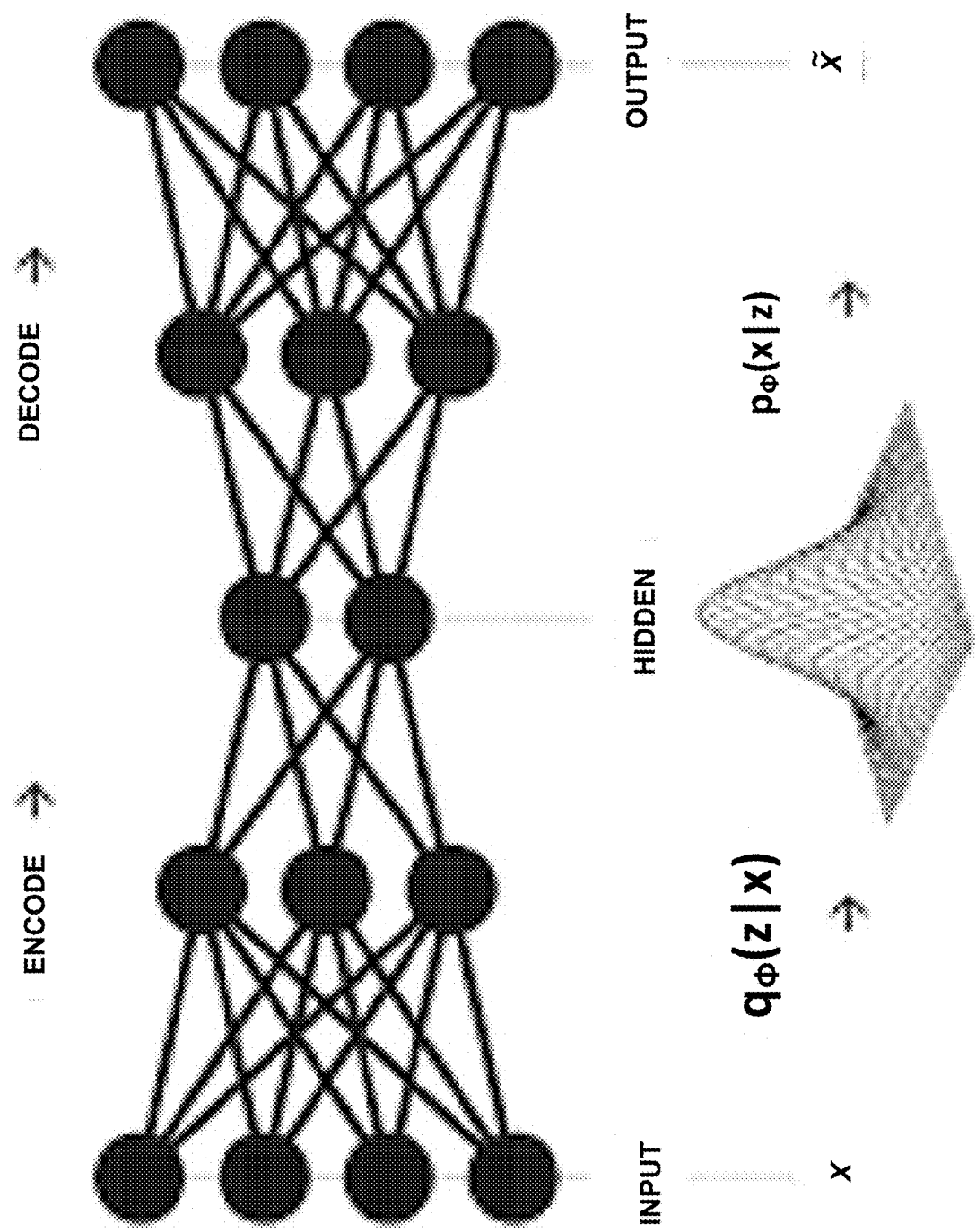
FIG. 6 shows a conceptual diagram of an auto-encoder deep neural network.
Figure 7:
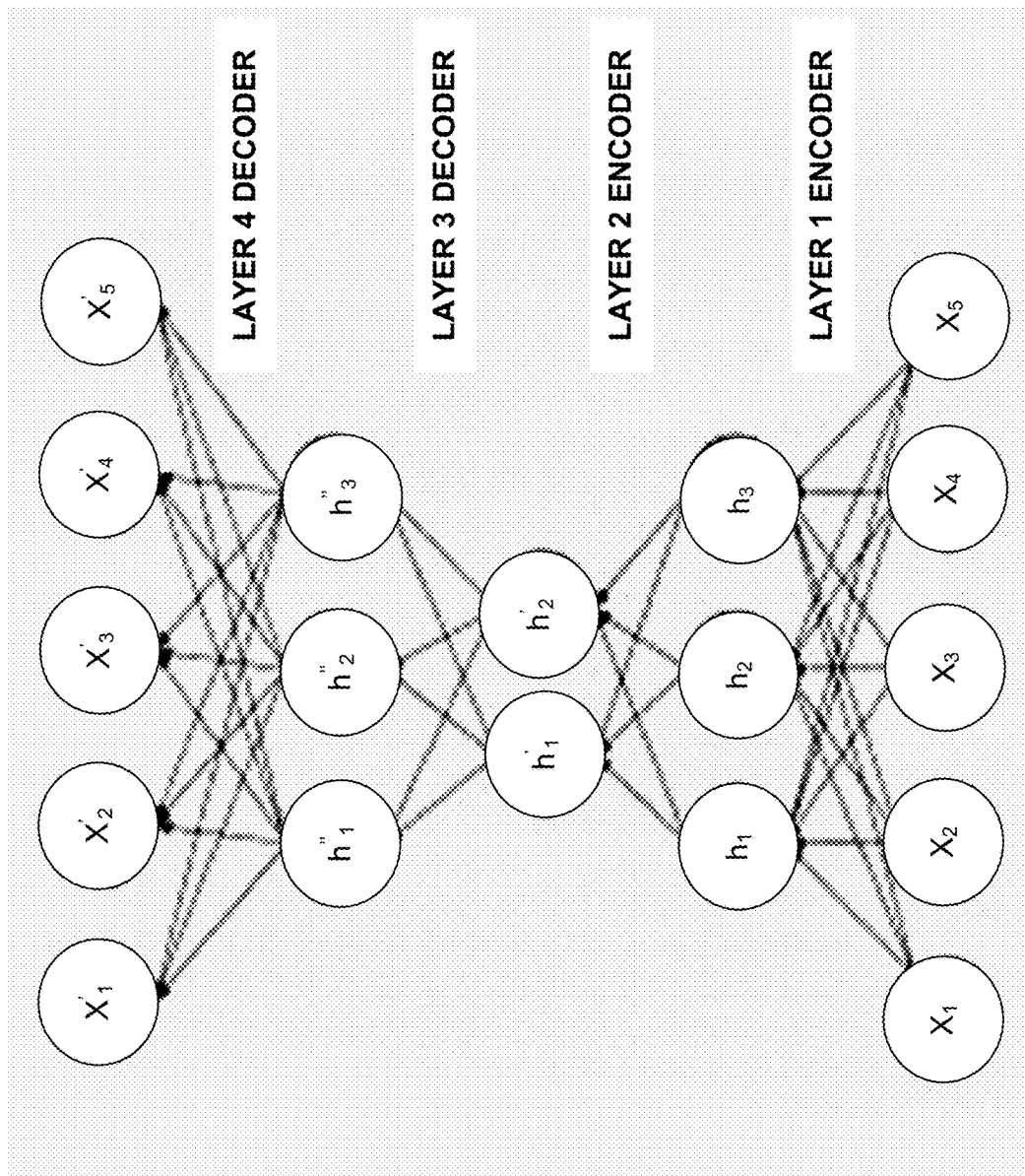
FIG. 7 shows a conceptual diagram of an alternate view of an auto-encoder deep neural network.

For computation sessions that are not purely neural network based, a similar process may be applied. A hierarchical pipeline may be created where MIST mapper 334 may pass a reduced set of analyzed data up to higher-layers. In this case, MIST mapper 334 may apply any logical reductive function at the field nodes (e.g., field nodes 303) and the reduced data is passed up the line. For example, MIST mapper 334 may be configured to map an auto-encoder to a MIST network. Auto-encoders as illustrated below, may have fewer hidden layers toward the center of the graph than at input or output layer. Note that in a stacked network, an auto-encoder may feed an upstream neural net as shown in FIGS. 6 and 7.

Assuming that input data is distributed across the field nodes, MIST mapper 334 may optimally map an auto-encoder such that the layers with the fewest nodes (layer 3 in the diagrams above) would be the convergence point where the data is conveyed over virtual links to the cloud. In the cloud, MIST mapper 334 may further process the auto-encoder through multiple additional stages.

A basic process that for altering a neural network to be mapped to a MIST network in this way is as follows. MIST mapper 334 chooses a convergence point that will be mapped to a WAN connection/virtual link. For each node that is mapped to a WAN connection, MIST mapper 334 adds a new layer to the network. This new layer may have a fixed identity function such that the data is transported without being altered. MIST mapper 334 may use this simple auto-encoder to convey the utility of the MIST computing in a simple way. Real deployments may be much more complex. For example, there may be 3-6 orders of magnitude more input layers than in our simplified example. But even at scale the same techniques are applied and may be even more beneficial in terms of cost optimization.

Another optimization process that can be used by MIST mapper 334 may be utilized with recurrent models. Recurrent models, as opposed to feed-forward networks, are not acyclic. Thus, recurrent models can retain state internally. Due to the complexity of recurrent model networks, the cost optimizer may tend to map all the cycles in the graph to the node that is closest to all of its inputs.

These techniques may also be used with layered architectures that are not non-neural network models such as decision trees, kernel methods or ensemble methods mixing both types of models. They may also use heterogeneous techniques. In all cases, the basic optimization of MIST networks may be beneficial.

A network and information security and intrusion detection application is discussed in the following. Detecting intruders in a network or other IT infrastructure is a crucial but vexing problem. The means of attack are numerous and the amount of data that would need to be examined is large and constantly changing. Some intrusion detection systems search for signatures (e.g., bit patterns) in data that have identified previous attacks. Such systems are weak because signatures are only applicable to known attacks and thus has a high-false negative rate. Perhaps worse, such systems may generate a high number of false positives. This is because the indicators themselves are very simplistic.

Another significant problem is that of the "Base Rate Fallacy" or "Bayesian Fallacy". The Bayesian fallacy implies that even an exceedingly low false positive rate when applied to detecting incidents that have a low base rate of actual occurrence will always have a realized high-false positive rate. If I is an intrusion and E is an event then the equation holds the following.

$$P(I|E)=P(E|I)*P(I)/P(E) \qquad \text{EQUATION 2}$$

Equation 2 is the likelihood of a true incident is lowered by a factor of P(I). This is the number of intrusion per whatever we are examining. In the case of signature intrusion detection systems, the basic unit is a packet and intrusion activity may be as high as 1 in millions or higher.

More complex analysis can cover larger and more complex sets of data. These more complex data sets will have a higher rate of being associated with a real intrusion. In effect, they group multiple packets into single observations. Thus, the incident rate is increased by the average number of packets in each analysis.

This type of complex analysis is not practical with current technology. There have been proposals to send all the packets into a data center cluster and process them there. However, moving the packets is expensive, introduces complexity and delay.

With MIST computing, streaming network data can be processed by a machine learning model and the original packets may then be discarded.

A specific example of this is the detection of attacks that are currently classified as enterprise ransomware. These exploits involve a piece of malicious software to find as many stored files on the network as possible, encrypt them and then direct the victim to communicate with the attacker in order to extort them for the decrypting key.

Detecting new versions of such malicious software known as "zero-day malware" as a term of art, is exceedingly difficult. By definition, there are no known signatures to identify this type of malware. Only by observing the behavior of the malware can it be detected.

This disclosure describes an approach to ransomware detection that uses behavioral analysis. But the sheer volume of streaming data needed to accomplish this may require the use of MIST computing, as described herein.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable medium or computer-readable storage medium or device, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various examples of the invention have been described. These and other examples are within the scope of the following claims.

What is claimed is:

1. A Multi-site Integrated Session-oriented Transaction (MIST) computing system, the system comprising:
one or more field nodes;
a central processing facility comprising one or more cloud nodes, the central processing facility geographically remote from each of the one or more field nodes;
a wide area network comprising one or more virtual links, each virtual link of the one or more virtual links connecting a corresponding field node of the one or more field nodes to at least one of the cloud nodes;
a MIST controller comprising a MIST compiler and a MIST mapper, executing on a computing platform,
wherein the MIST compiler is configured to process a distributed compute session request for a distributed dataset to generate a compiled distributed compute session request comprising one or more functions and one or more data dependencies, wherein the distributed dataset comprises one or more geographically-distributed sets of data, the sets of data including at least one remote set of data that is proximate to one of the field nodes, and
wherein the MIST mapper is configured to:
process the compiled distributed compute session request to determine, for each of the at least one remote sets of data, whether to process the remote set of data with a proximate field node of the field nodes that is proximate to the remote set of data or with a cloud node of one of the cloud nodes, based on a comparison of a first total cost comprising a cost of transporting the remote set of data from the proximate field node to the cloud node via a corresponding virtual link of the plurality of virtual links and a computational cost for processing the remote set of data at the cloud node with a second total cost comprising a computation cost for processing the remote set of data at the proximate field node to generate output data and a cost of transporting the output data from the proximate field node to the cloud node via the corresponding virtual link;
in response to determining to process the remote set of data with the cloud node, output a data retrieval request to the proximate field node to cause the proximate field node to send the remote set of data to the cloud node for processing at the cloud node; and
in response to determining to process the remote set of data with the proximate field node, output a computation request to the proximate field node to cause the proximate field node to process the remote set of data.

2. The system of claim 1, comprising:
a MIST cluster comprising the one or more cloud nodes and the one or more field nodes interconnected with the one or more virtual links.

3. The system of claim 2, wherein each of the one or more virtual links comprises a secure virtual tunnel.

4. The system of claim 1, comprising:
a cluster manager configured to track one or more of resources of the one or more cloud nodes and the one or more field nodes, data proximity for sets of data to the field nodes, and resource costs,
wherein the MIST mapper is configured to determine whether to process the remote set of data with one of the field nodes that is proximate to the remote set of data or with the cloud node of one of the cloud nodes further based on one of more of the resources of the one or more cloud nodes and the one or more field nodes, the data proximity for sets of data to the field nodes, or the resource costs.

5. The system of claim 1, wherein, to determine whether to process the remote set of data with one of the field nodes that is proximate to the remote set of data or with the cloud node, the MIST mapper is configured to determine a first proximity of a data source for the computation request relative to the field node and determine a second proximity of the data source for the computation request relative to the cloud node.

6. The system of claim 5, wherein the MIST mapper is configured to select the field node from the plurality of field nodes in response to determining that the first proximity is less than a proximity of each other node of the plurality of field nodes.

7. The system of claim 1, wherein, to determine whether to process the remote set of data with one of the field nodes that is proximate to the remote set of data or with the cloud node, the MIST mapper is configured to apply machine learning.

8. The system of claim 1, wherein the compiled distributed compute session request is a first compiled distributed compute session request, and wherein the MIST mapper is configured to:
process a second compiled distributed compute session request to determine, for each of one or more geographically-distributed sets of data for the second compiled distributed compute session request, whether to process the remote set of data for the second compiled distributed compute session request with one of the field nodes that is proximate to the remote set of data or with the cloud node, based on a cost of transporting the remote set of data from the proximate field node to the cloud node via one of the plurality of virtual links;
in response to determining to process the remote set of data for the second compiled distributed compute session request with the cloud node, output a data retrieval request for the second compiled distributed compute session request to the proximate field node to cause the proximate field node to send the remote set of data for the second compiled distributed compute session request to the cloud node for processing at the cloud node; and
in response to determining to process the remote set of data for the second compiled distributed compute session request with the field node, output a computation request for the second compiled distributed compute session request to the proximate field node to cause the proximate field node to process the remote set of data.

9. The system of claim 1, wherein the computation request comprises a request to process streaming network data for network and information security and intrusion detection.

10. The system of claim 9,
wherein the MIST compiler determines to process the computation request at the field node; and
wherein, to process the streaming network data, the field node is configured to generate behavioral analysis information and send information for the streaming network data to the cloud node.

11. The system of claim 10, wherein the cloud node determines malware is detected in the MIST computing system using the behavioral analysis information.

12. The system of claim 1, wherein, to determine whether to process the remote set of data with one of the field nodes that is proximate to the remote set of data or with the cloud node, the MIST mapper is configured to calculate a cost function based on the cost of transporting data for the computation request on the plurality of virtual links to the cloud node.

13. The system of claim 12, wherein, to calculate the cost function, the MIST mapper is configured to calculate the cost function further based on one or more of a computational graph for a session for the computation request, data at the cloud node, data at one or more of the plurality of field nodes, a bandwidth at the plurality of virtual links, or a latency at the plurality of virtual links.

14. A method for Multi-site Integrated Session-oriented Transaction (MIST) computing comprising:
processing, by processing circuitry, a distributed compute session request for a distributed dataset to generate a compiled distributed compute session request comprising one or more functions and one or more data dependencies, wherein the distributed dataset comprises one or more geographically-distributed sets of data, the sets of data including at least one remote set of data that is proximate to one of one or more field nodes, wherein a wide area network comprises one or more virtual links, each virtual link of the one or more virtual links connecting a corresponding field node of the one or more field nodes to at least a cloud node of one of one or more cloud nodes of a central processing facility, the central processing facility being geographically remote from each of the one or more field nodes;
processing, by the processing circuitry, the compiled distributed compute session request to determine, for each of the at least one remote sets of data, whether to process the remote set of data with a proximate field node of the field nodes that is proximate to the remote set of data or with a cloud node of one of the cloud nodes, based on a comparison of a first total cost comprising a cost of transporting the remote set of data from the proximate field node to the cloud node via a corresponding virtual link of the plurality of virtual links and a computational cost for processing the remote set of data at the cloud node with a second total cost comprising a computation cost for processing the remote set of data at the proximate field node to generate output data and a cost of transporting the output data from the proximate field node to the cloud node via the corresponding virtual link;
in response to determining to process the remote set of data with the cloud node, outputting, by the processing circuitry, a data retrieval request to the proximate field node to cause the proximate field node to send the remote set of data to the cloud node for processing at the cloud node; and
in response to determining to process the remote set of data with the proximate field node, outputting, by the processing circuitry, a computation request to the proximate field node to cause the proximate field node to process the remote set of data.

15. The method of claim 14, wherein a MIST cluster comprises the one or more cloud nodes and the one or more field nodes interconnected with the one or more virtual links.

16. The method of claim 15, wherein each of the one or more virtual links comprises a secure virtual tunnel.

17. The method of claim 14, further comprising:
tracking one or more of resources of the one or more cloud nodes and the one or more field nodes, data proximity for sets of data to the field nodes, and resource costs,
wherein determining whether to process the remote set of data with one of the field nodes that is proximate to the remote set of data or with the cloud node of one of the cloud nodes further is based on one of more of the resources of the one or more cloud nodes and the one or more field nodes, the data proximity for sets of data to the field nodes, or the resource costs.

18. The method of claim 14, wherein determining whether to process the remote set of data with one of the field nodes that is proximate to the remote set of data or with the cloud node comprises determining a first proximity of a data source for the computation request relative to the field node and determine a second proximity of the data source for the computation request relative to the cloud node.

19. The method of claim 18, further comprising:
selecting the field node from the plurality of field nodes in response to determining that the first proximity is less than a proximity of each other node of the plurality of field nodes.

20. A non-transitory computer-readable storage device comprising instructions that, when executed, cause one or more processors to perform operations including:
processing a distributed compute session request for a distributed dataset to generate a compiled distributed compute session request comprising one or more functions and one or more data dependencies, wherein the distributed dataset comprises one or more geographically-distributed sets of data, the sets of data including at least one remote set of data that is proximate to one of one or more field nodes, wherein a wide area network comprises one or more virtual links, each virtual link of the one or more virtual links connecting a corresponding field node of the one or more field nodes to at least a cloud node of one of one or more cloud nodes of a central processing facility, the central processing facility being geographically remote from each of the one or more field nodes;
processing the compiled distributed compute session request to determine, for each of the at least one remote sets of data, whether to process the remote set of data with a proximate field node of the field nodes that is proximate to the remote set of data or with a cloud node of one of the cloud nodes, based on a comparison of a first total cost comprising a cost of transporting the remote set of data from the proximate field node to the cloud node via a corresponding virtual link of the plurality of virtual links and a computational cost for processing the remote set of data at the cloud node with a second total cost comprising a computation cost for processing the remote set of data at the proximate field node to generate output data and a cost of transporting the output data from the proximate field node to the cloud node via the corresponding virtual link;
in response to determining to process the remote set of data with the cloud node, outputting a data retrieval request to the proximate field node to cause the proximate field node to send the remote set of data to the cloud node for processing at the cloud node; and
in response to determining to process the remote set of data with the proximate field node, outputting a computation request to the proximate field node to cause the proximate field node to process the remote set of data.

* * * * *